July 8, 1958
C. SKOWRON
2,842,011
VARIABLE SPEED AND TORQUE TRANSMISSION
Filed April 16, 1956
4 Sheets-Sheet 1
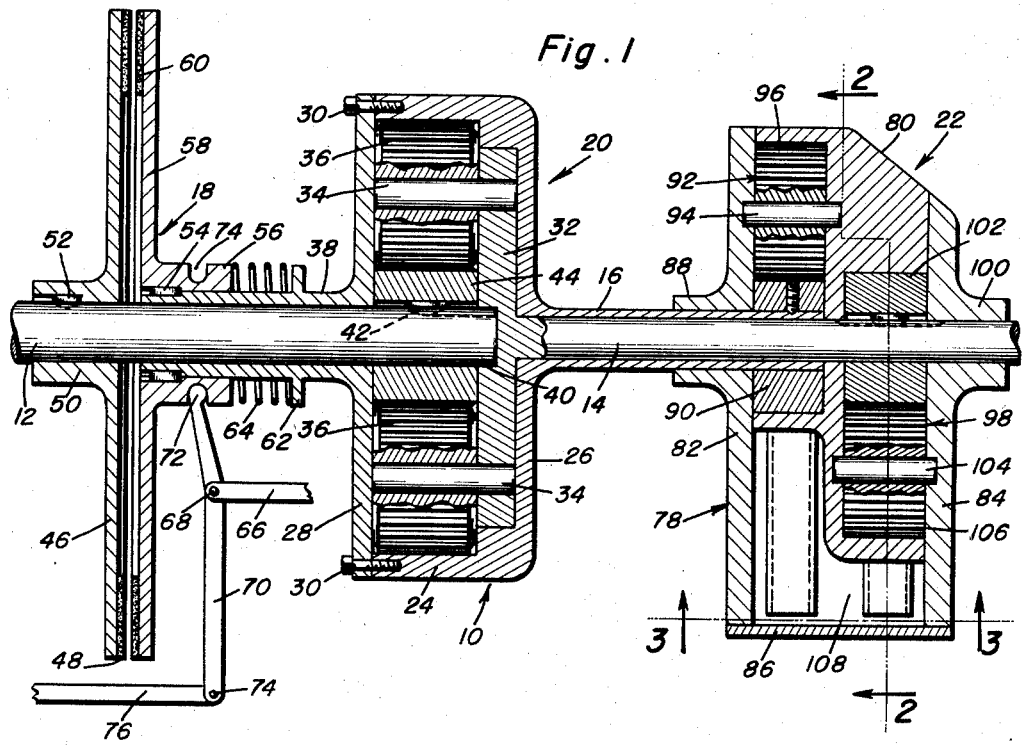
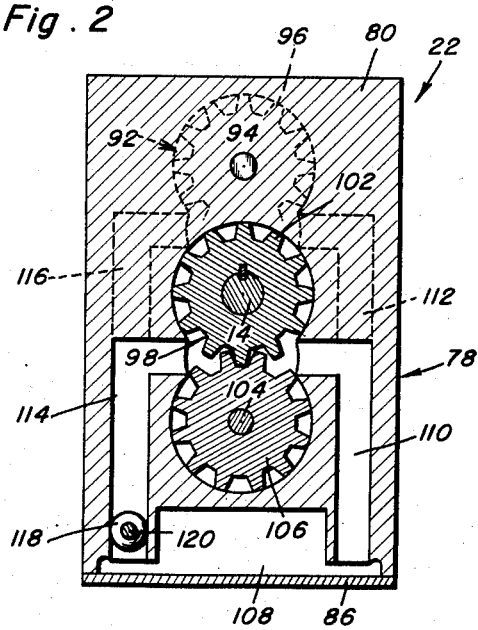
Carl Skowron
INVENTOR.

July 8, 1958

C. SKOWRON 2,842,011

VARIABLE SPEED AND TORQUE TRANSMISSION

Filed April 16, 1956

Carl Skowron
INVENTOR.

BY
Attorneys

July 8, 1958      C. SKOWRON      2,842,011
VARIABLE SPEED AND TORQUE TRANSMISSION
Filed April 16, 1956      4 Sheets-Sheet 3
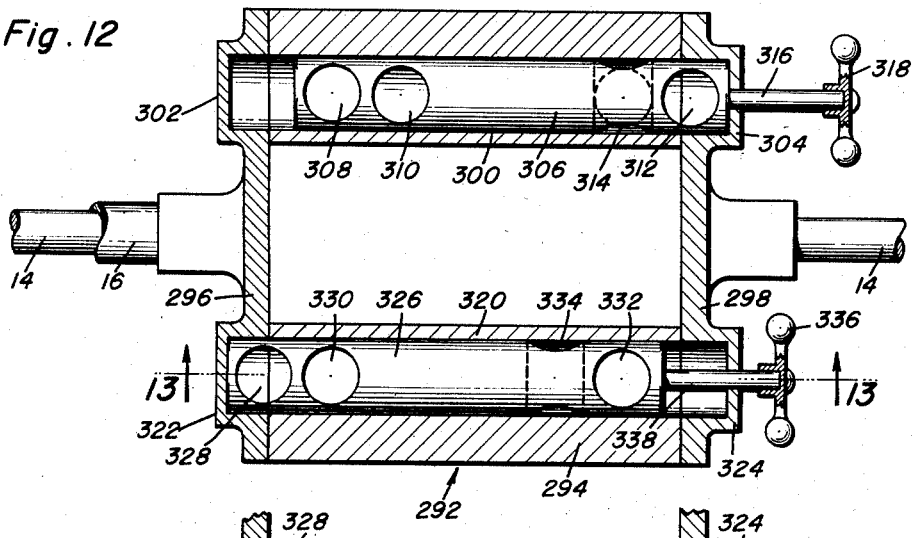
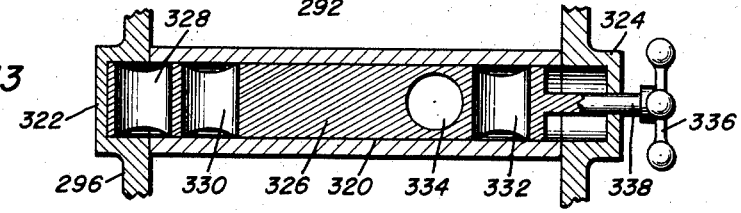
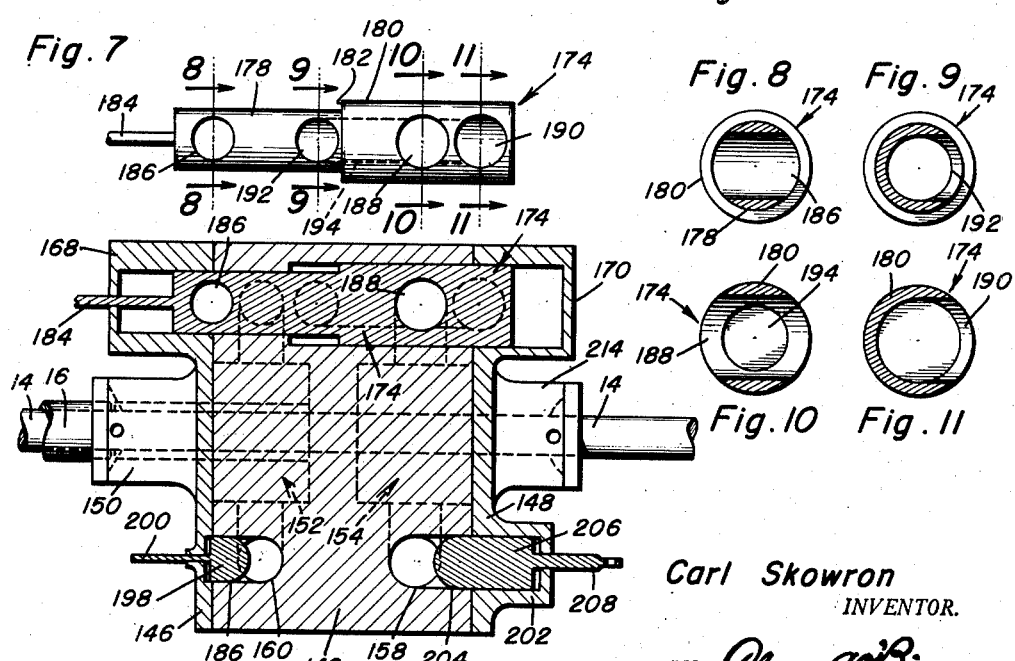
Carl Skowron
INVENTOR.

July 8, 1958 C. SKOWRON 2,842,011
VARIABLE SPEED AND TORQUE TRANSMISSION
Filed April 16, 1956 4 Sheets-Sheet 4

Carl Skowron
INVENTOR.

BY

United States Patent Office 2,842,011
Patented July 8, 1958

2,842,011
VARIABLE SPEED AND TORQUE TRANSMISSION
Carl Skowron, Salem, Ohio Application April 16, 1956, Serial No. 578,418

11 Claims. (Cl. 74—786)

This invention relates in general to new and useful improvements in transmissions and more specifically to an improved transmission wherein it is possible to vary both the speed and torque thereof.

The primary object of this invention is to provide a variable speed and torque transmission which may be easily controlled, the transmission including a planetary gear unit which is controlled by a pump unit, there being provided simple controls for the pump unit.

Another object of this invention is to provide an improved variable speed and torque transmission of the type which includes a fluid coupling and a planetary gear unit, the fluid coupling controlling the operation of the planetary gear unit and including a pair of pumps, one of the pumps being connected to the ring gear of the planetary gear unit and the other of the pumps being connected to the spider for the planetary gears of the planetary gear units.

Still another object of this invention is to provide an improved variable speed and torque transmission of the type which utilizes a hydraulic control unit, the hydraulic control unit being in the form of a pair of pumps, there being provided suitable valve means for controlling the operation of the pumps whereby the force required to turn the pumps may be selectively varied.

Still another object of this invention is to provide an improved variable speed and torque transmission, the transmission including an input shaft, a planetary gear unit and a pump unit, the input shaft being selectively connected to the ring gear of the planetary gear unit by means of a clutch, the pump unit controlling the turning of the spider for the planetary gears of the planetary gear unit and the ring gear of the planetary gear unit whereby full control of the planetary gear unit may be obtained.

A further object of this invention is to provide an improved transmission which includes a clutch for selectively locking up a planetary gear unit and a pump unit for controlling the operation of the planetary gear unit, there being means connecting the clutch to the pump unit whereby control of the pump unit will automatically result in the control of the clutch.

A still further object of this invention is to provide an improved hydraulic control unit for a variable speed and torque transmission of the type which includes a planetary gear unit controlled by a pair of pumps, the hydraulic control unit including reversible valves which are of such a nature whereby the transmission may operate even though the input shaft thereof has its direction of rotation reversed.

Yet a further object of this invention is to provide an improved clutch which is formed of a pair of resilient plates parabolic in cross-section, the plates being disposed in opposed relation and having peripheral portions thereof secured together, there being secured to the peripheral portions clutch shoes which are normally urged into engagement with a drum, there being provided suitable means for separating the plates whereby the clutch is released.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal sectional view taken through a simple form of the present invention and shows the arrangement of the various shafts of the transmission, the clutch, the planetary gear unit and the pump unit;

Figure 2 is a transverse vertical sectional view taken substantially upon the plane indicated by the section line 2—2 of Figure 1 and shows the general details of the pump unit;

Figure 3 is a fragmentary horizontal sectional view taken substantially upon the plane indicated by the section line 3—3 of Figure 1 and shows the valve means for controlling the operation of the pump unit;

Figure 6 is a fragmentary horizontal sectional view taken substantially upon the plane indicated by the section line 6—6 of Figure 4 and shows the specific arrangement of the valve means for the pump unit;

Figure 7 is a rotative side elevational view of one of the valve members of the valve means and shows the specific arrangement of the ports formed therein;

Figure 8 is an enlarged fragmentary sectional view taken substantially upon the plane indicated by the section line 8—8 of Figure 7;

Figure 9 is an enlarged fragmentary transverse vertical sectional view taken substantially upon the plane indicated by the section line 9—9 of Figure 7;

Figure 10 is an enlarged transverse sectional view taken substantially upon the plane indicated by the section line 10—10 of Figure 7;

Figure 11 is an enlarged transverse vertical sectional view taken substantially upon the plane indicated by the section line 11—11 of Figure 7;

Figure 12 is an enlarged fragmentary horizontal sectional view similar to Figure 6 and shows the details of a modified form of valve means, the valve means including valve elements which are reversible;

Figure 13 is an enlarged fragmentary sectional view taken substantially upon the plane indicated by the section line 13—13 of Figure 12 and shows the specific details of one of the valve members;

Figure 4:
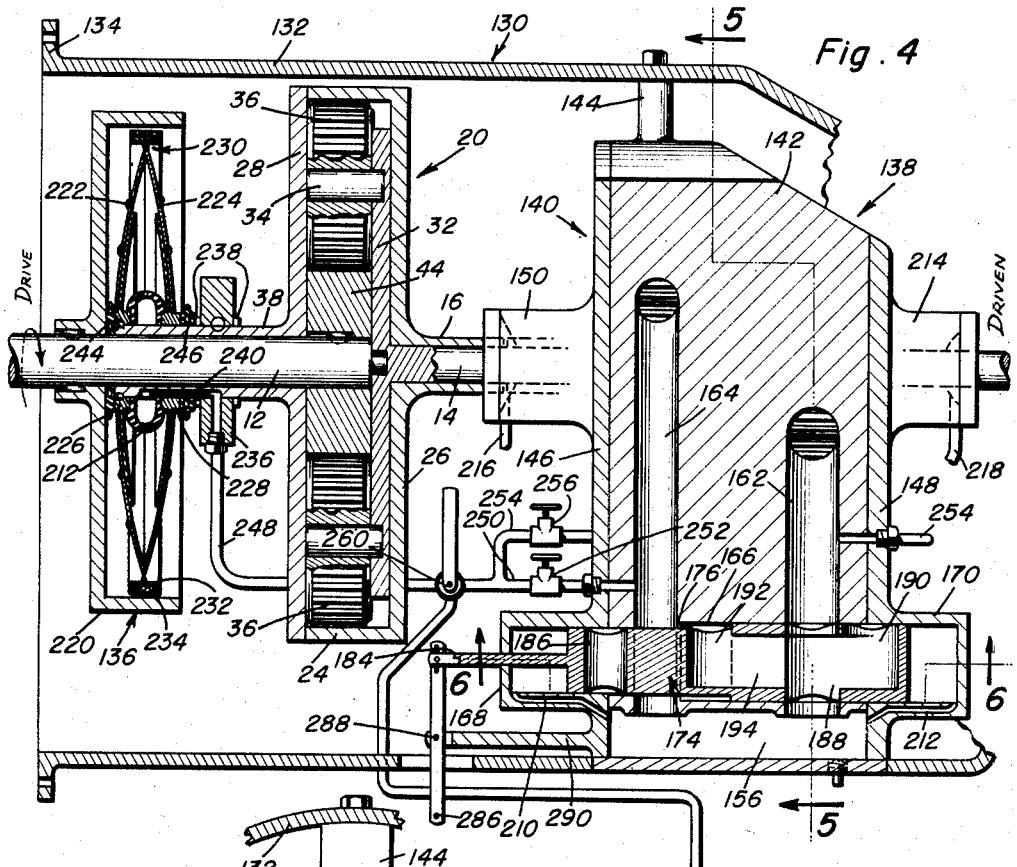
Figure 4 is a longitudinal vertical sectional view taken through a more complicated form of the invention and shows complete controls for operating the same, the transmission also including a housing for securement to a bell housing of an internal combustion engine.
Figure 5:
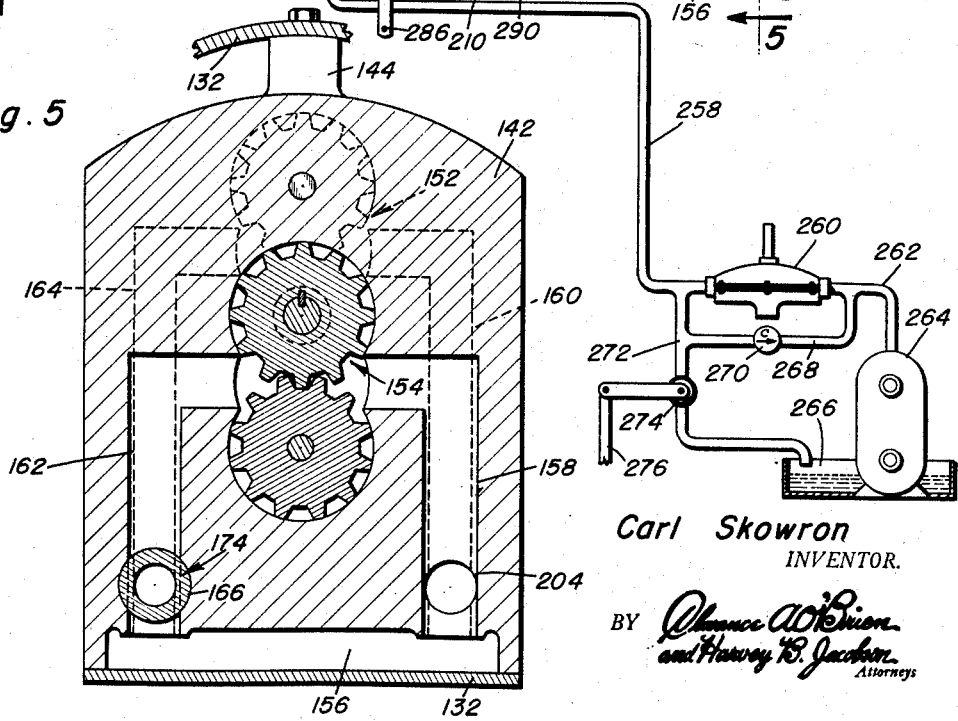
Figure 5 is a fragmentary vertical sectional view taken substantially upon the plane indicated by the section line 5—5 of Figure 4 and shows the general details of the pump unit.

Referring now to the drawings in detail, it will be seen that there is a simplified form of transmission conforming to the spirit of the present invention, the transmission being referred to in general by the reference numeral 10. The transmission 10 includes an input shaft 12, an output shaft 14, and a control shaft 16. Carried by the various shafts 12, 14 and 16 are a clutch 18, a planetary gear unit 20 and a pump unit 22.

The planetary gear unit 20 includes an internal ring gear 24 having a mounting plate 26 formed integrally along one side thereof. Secured to the opposite end of the ring gear 24 is a closure plate 28 which is removably retained in place by circumferentially spaced bolts 30. The ring gear 24, the plate 26 and the plate 28 form the housing portion of the planetary gear unit 20.

The control shaft 16 is of the tubular type and is suitably secured to the plate 26. Journaled in the control shaft 16 is the output shaft 14. Secured to the forward end of the output shaft 14 and disposed within the general confines of the planetary gear unit 20 is a spider 32. The spider 32 carries shafts 34 on which there are rotatably journaled planetary gears 36. The gears 36 are continuously meshed with the ring gear 24.

Secured to the plate 28 and extending forwardly therefrom in telescoping engagement with the input shaft 12 is a sleeve 38. The sleeve 38 performs the dual function of connecting the ring gear 34 to the clutch 18 and providing a suitable bearing for the input shaft 12. The input shaft 12 has the rear or right end thereof, as viewed in Figure 1, journaled in the spider 32 as at 40. Carried by the input shaft 12 and keyed thereto by a suitable key 42 is a sun gear 44. The sun gear 44 is disposed in meshed driving engagement with the planetary gears 36.

The clutch 18 includes a first clutch plate 46 having a suitable lining 48 on one face thereof. Secured to the opposite face of the clutch plate 46 is a hub 50 which is keyed to the input shaft 12 by a suitable key 52. Positioned on the sleeve 38 and keyed thereto by means of a key 54 is a hub 56. The hub 56 is secured to a second clutch plate 58 having a clutch lining 60. The linings 60 and 48 are in opposed engagement and serve to interlock the plates 46 and 58.

The sleeve 38 is provided with a collar 62. Disposed between the collar 62 and the hub 56 is a spring 64 which normally urges the plates 46 and 58 together so as to result in a normal engagement of the clutch 18.

In order that the clutch 18 may be suitably released when desired, there is provided a bracket 66 which is fixedly supported by any part of the transmission 10, such as the fixed part of the pump 22. Pivotally connected to the bracket 66 by means of a pivot pin 68 is a link 70 having a ball portion 72 engaged in a groove 74 formed in the hub 56 which also functions as a collar. Connected to the opposite end of the link 70 by means of pivot pin 74 is a control link 76. By operating the control link 76, the clutch 18 may be selectively released against the pressure of the spring 64.

The pump unit 22 includes a housing which is referred to in general by the reference numeral 78. The housing is formed of a central section 80, a left end plate 82, a right end plate 84 and a bottom plate 86, all of the various parts of the housing 78 being releasably secured together by any desired fastener.

The plate 82 has formed integral therewith a hub 88 in which there is journaled a rear portion of the control shaft 16. Secured to the control shaft 16 for rotation therewith is a drive gear 90 of a positive displacement pump 92, the pump 92 being of the gear type. The pump 92 also includes an idler shaft 94 which extends between and is carried by the plate 82 and the central portion 80. Journaled along the shaft 94 is a second pump gear 96 which cooperates with the gear 90 to pump fluid in response to rotation of the control shaft 16.

The pump unit 22 also includes a second positive displacement pump of the gear type, the pump being referred to by the reference numeral 98. The pump 98 is similar to the pump 92, but differs therefrom in that it is of a larger size and a larger capacity.

The output shaft 14 extends entirely through the housing 78 and the right hand portion thereof, as viewed in Figure 1, is journaled in a hub 100 of the plate 84. Carried by an intermediate portion of the output shaft 14 is a drive gear 102 of the pump 98. Extending between the central portion 80 and the plate 84 is an idler shaft 104 on which there is mounted a second pump gear 106. The pump gear 106 is meshed with the pump gear 102 and cooperates therewith.

It is to be noted that the central portion 80 terminates above the bottom plate 86. The space between the central portion 80 and the bottom plate 86 forms a reservoir 108 for the hydraulic fluid.

Formed in the intermediate portion 80 is a vertical inlet passage 110 communicating the reservoir 108 with the pump 98. A similar inlet passage 112 communicates the pump 92 with the reservoir 108. The pump 98 also includes an outlet passage 114 formed in the intermediate portion 80. A similar outlet passage 116 is formed in the intermediate portion 80 for the pump 92.

Slidably carried by the housing 78 and extending transversely of the outlet passages 114 and 116 is a valve member 118 carried by a threaded shank 120 having a control handle 122. The threaded shank 122 is threadedly engaged in a special fitting 124 releasably carried by the plate 84 to facilitate the removal of the valve member 118. The valve member 118 intersects the outlet passages 114 and 116 and is of such a length whereby at such time as it completely clears one of the outlet passages 114 and 116, it will completely close the other of the outlet passages 114 and 116.

From the foregoing description of the valve member 118, it will be readily apparent that the volume of hydraulic fluid pumped by the pumps 92 and 98 may be selectively controlled. By controlling the volume of output of the pumps 92 and 98, the torque required to drive these pumps may be selectively varied. Further, by completely shutting off one of the outlet passages, the particular pump could be prevented from being driven.

Inasmuch as the pumps 92 and 98 are connected to the ring gear 24 and the spider 32 by the control shaft 16 and the output shaft 14, respectively, it will be readily apparent that the planetary gear unit 20 may be so controlled whereby the speed, direction of rotation and torque of the output shaft 14 may be varied without varying any of the characteristics of the input shaft 12. It is well known that in a planetary gear unit, if the sun gear is driven and either the spider or the ring gear is restrained against movement, the characteristics of the output of the planetary gear unit may be varied as desired.

The clutch 18 is utilized to selectively couple the ring gear 24 to the input shaft 12. Inasmuch as the sun gear 44 is coupled to the input shaft 12, when both the sun gear 44 and the ring gear 24 are coupled to the input shaft 12, relative rotation of the gears of the planetary gear unit 20 is prevented and the entire planetary gear unit 20 is locked to operate as a unit. In such event, the input shaft 12, the output shaft 14 and the control shaft 16 will rotate at the same speed and a one-to-one drive ratio may be effected. Any other drive ratio desired may be effected by properly shifting the valve member 118.

Referring now to Figures 4 through 11, inclusive, it will be seen that there is illustrated a modified form of transmission which is referred to in general by the reference numeral 130. The transmission 130 includes a casing 132 having a mounting flange 134 which may be attached to the bell housing (not shown) of an automobile engine. The transmission 130 incorporates the input shaft 12, the output shaft 14, the control shaft 16 and the planetary gear unit 20. However, it employs a modified form of clutch, which is referred to in general by the reference numeral 136 and a modified form of pump unit, which is referred to in general by the reference numeral 138.

The pump unit 138 is very similar to the pump unit 22 and differs therefrom primarily in the details of the valve therefor. The pump unit 138 includes a housing which is referred to in general by the reference numeral 140. The housing 140 includes primarily an enlarged center portion 142 which is secured to the upper part of the casing 132 by means of a strut 144. The forward end of the housing 140 is formed by a plate 146 and the rear end is formed by a plate 148. The bottom part of the casing 130 is secured to the lower ends of the plates 146 and 148 and forms the bottom of the housing 140.

Formed integral with the plate 146 is a hub 150 in which there is journaled a rear portion of the control shaft 16. The control shaft 16 extends into the housing 140 and drives a pump 152 which is identical with the pump 92. A second pump 154 which is identical with the pump 98, is driven by the output shaft 14. It is not believed that it is necessary to further describe the details of the pumps 152 and 154.

The lower part of the housing 140 below the intermediate portion 142 is in the form of a hydraulic fluid reservoir 156. The reservoir 156 is communicated with the pump 154 by an inlet passage 158. A similar inlet passage 160 communicates the pump 152 with the reservoir 156. The pump 154 is also communicated with the reservoir 156 by an outlet passage 162. A similar outlet passage 164 communicates the pump 152 with the reservoir 156.

Referring now to Figures 4 and 6 in particular, it will be seen that formed in the lower part of the intermediate portion 142 is a longitudinally extending valve passage 166. The valve passage 166 intersects the outlet passages 162 and 164. The plates 146 and 148 are provided with projecting cap portions 168 and 170, respectively, which form extensions of the valve passage 166. Slidably received in the valve passage 166 is a valve member which is referred to in general by the reference numeral 174. It is to be noted at this time that the valve passage 166 has a rear portion thereof which is larger than the forward portion and that a shoulder 176 is formed at the junction between the two.

Referring now to Figures 6 through 11, inclusive, it will be seen that the valve member 174 is circular in cross-section and includes a reduced forward portion 178 and an enlarged rear portion 180. The juncture between the portions 178 and 180 form a shoulder 182. Connected to the forward end of the forward portion 178 is an operator shaft 184.

Formed in the left end of the reduced portion 178, as viewed in Figure 7, is a transverse bore 186. Formed in the center of the enlarged portion 180 is a similar transverse bore 188. It is to be noted that the bores 186 and 188 are intended to be aligned with the outlet passages 164 and 162, respectively, and are of different sizes because of the different capacities of the pumps 152 and 154.

A partial bore 190 is formed in the right part of the enlarged portion 180 adjacent the bore 188. A similar partial bore 192 is formed in the right part of the reduced portion 178. A longitudinal bore 194 extends through the valve member 174 and communicates the bores 190 and 192.

Referring once again to Figure 6 in particular, it will be seen that the intermediate portion 142 is provided with a transverse passage 196 which extends transversely of the inlet passage 160. Slidably received in the passage 196 is a shut-off valve member 198. The shut-off valve member 198 has a suitable operator 200 which extends through the plate 146.

Formed both in the intermediate portion 142 and in a cap portion 202 of the plate 148 is a horizontal passage 204. Slidably received in the passage 204 is a shut-off valve member 206. The shut-off valve member 206 is provided with an operator 208 which extends through the cap 202. The passage 204 intersects the inlet passage 158 so that the valve member 206 may control the flow of fluid to the pump 154.

It is to be understood that the arrangement of the various bores and passages in the valve member 174 is such that when the bore 188 is aligned with the outlet passage 162, the outlet passage 164 is closed. Thus when the valve member 174 is so arranged, only the output shaft 14 is free to rotate, the control shaft 16 being locked up. On the other hand, if the bore 186 is aligned with the outlet passage 164, the outlet passage 162 is closed and the output shaft 14 is prevented from rotating while the control shaft 16 is free to rotate. An intermediate position of the valve member 174 will permit restrained driving of both of the pumps 152 and 154.

The partial bores 190 and 192 are so positioned whereby when the bore 190 is arranged with the outlet passage 162, the bore 192 is aligned with the outlet passage 164. Inasmuch as the pump 154 is of a greater capacity than the pump 152, the pump 154, when arranged in opposition to the pump 152, will drive the pump 152 with the pump 152 acting as a motor. This will result in the driving of the ring gear 24 through the control shaft 16 in an opposite direction to produce an overdrive. Thus the outlet shaft 14 can be driven at a greater speed than the input shaft 12 when the valve member 174 is in this last mentioned position.

In order to permit the collection of any hydraulic fluid which may flow pass the ends of the valve member 174, the cap 168 is provided with a suitable drain passage 210 which is communicated with the reservoir 156. A similar drain passage 212 is formed in the cap 170. The hub 150 as well as a hub 214 of the plate 148 are provided with drain lines 216 and 218, respectively, draining back into the reservoir 156 any hydraulic fluid which may flow past the control shaft 16 and the output shaft 14.

At this time, it is pointed out that when the pumps 152 and 154 at the outlet ends thereof communicate with the reservoir 156 and the inlet passages 158 and 160 are closed, there is little or no resistance to the driving of the pumps 152 and 154 inasmuch as they will not pump any hydraulic fluid.

The clutch 136 includes a drum 220 which is secured to the input shaft 12. The clutch 136 also includes a pair of opposed spring plates 222 and 224 which are parabolic in cross-section. The plate 222 is provided with a hub 226 which is keyed onto the sleeve 38. A similar hub 228 keys the plate 224 on the sleeve 38. The peripheral portions of the plates 222 and 224 are connected together to form in conjunction with the sleeve 38 a sealed container. Connected to the peripheral edge of the plates 222 and 224 is a clutch shoe which is referred to in general by the reference numeral 230. The clutch shoe 230 includes a backing 232 and a lining 234. The resiliency of the plates 222 and 224 is such that it normally urges the clutch shoes 230 into frictional interlocking engagement with the clutch drum 220. Inasmuch as the clutch drum 220 is secured to the input shaft 12 and the plates 222 and 224 are connected to the ring gear 24, when the clutch 136 is engaged, the planetary gear unit 20 is locked up against rotation. At this time, the inlet passages 158 and 160 should be closed so that there is no resistance to the driving of the gears of the pumps 152 and 154.

Carried by the collar 38 and journaled relative thereto so as to be fixed while the collar 38 rotates is a distributor collar 236. The distributor collar 236 is retained in place by a pair of sealing positioning collars 238. The distributor collar 236 is continuously communicated with a hydraulic passage 240 formed in the sleeve 38. The opposite end of the hydraulic passage 240 communicates with the interior of the fluid tight chamber formed by the plates 222 and 224. The hubs 226 and 228 are sealed with respect to the sleeve 38 by an internal seal 242 and external seals 244 and 246. A hydraulic fluid line 248 is coupled to the distributor collar 236.

When hydraulic fluid under pressure is introduced into the chamber between the plates 222 and 224, the plates 222 and 224 will have the central portions thereof urged apart and thus the clutch shoes 230 will be pulled away from the drum 220 releasing the clutch 136.

The hydraulic line 248 is communicated with the outlet passage 164 by a line 250 having a manual shut-off valve 252. The hydraulic line 248 is connected to the outlet passage 162 by means of a line 254. The line 254 is provided with a manual shut-off valve 256. In the operation of the pump unit 138, fluid under pressure will be supplied to the clutch 136 either through the outlet passage 162 or the outlet passage 164. Thus the clutch 136 will normally remain disengaged. However, when it is desired to lock up the planetary gear unit 20, the valve members 198 and 206 are moved to closed positions, the pumps 152 and 154 will discontinue pumping. At this time pressure within the clutch 136 will be relieved and the resilient plates 222 and 224 will again urge the clutch shoe 230 into engagement with the clutch drum 220.

In the event a manual control for the clutch 136 is desired, there may be provided an additional hydraulic line 258 which is connected to the hydraulic line 248 by means of a controllable valve 260. The hydraulic line 258 has connected thereto a pressure regulator 260 which in turn is connected by means of a hydraulic line 262 to a pump 264. The pump 264 is connected to a suitable hydraulic reservoir 266. A by-pass line 268 bypasses the hydraulic pressure regulator 260 and is provided with a check valve 270. Another line 272 extends from the hydraulic line 258 down to the reservoir 266. The line 272 is provided with a controllable valve 274 having a control rod 276 which could be conveniently operated from the interior of a vehicle.

In order that the valve member 174 may be selectively positioned, there is connected to the operator 184 thereof a control lever 286. The intermediate portion of the control lever 286 is mounted on a pivot 288 carried by a support bracket 290. The support bracket 290 is formed as a part of the plate 146.

The foregoing described valve assemblies for the pump unit 148 are such that the input shaft 12 can be rotated only in one direction for the effective operation thereof. Inasmuch as the transmission 130 may possibly be desired for use other than automotive use and may have the input shaft 12 rotated in an opposite direction, there is illustrated a modified form of housing and valve assembly, the housing being referred to in general by the reference numeral 292. The housing 292 includes an intermediate portion 294 and end plates 296 and 298. With the exception of the valves to be described hereinafter, the housing 292 is identical with the housing of the pump 138.

Formed in the central portion 294 is a horizontal passage 300 which corresponds to the passage 166. The passage 300 is extended by means of cap portions 302 and 304 on the plates 296 and 298, respectively. Slidably mounted in the passage 300 and intersecting the outlet passages 162 and 164 is a valve member 306. The valve member 306 is provided adjacent its left end with a pair of normally vertically extending bores 308 and 310. A similar bore 312 is formed at the right end of the valve member 306. In addition to the bores 308, 310 and 312, there is provided a normally horizontal bore 304. The valve member 306 is provided with an actuator 316 which extends through the cap 304 and has a control handle 318.

In addition to the passage 300, there is provided a similar passage 320. The passage 320 is extended by means of caps 322 and 324 formed on the plates 296 and 298, respectively. Disposed within the passage 320 for sliding movement is a valve member 326 which is identical with the valve member 306 and includes vertical bores 328, 330 and 332. The valve member 326 also includes a horizontal bore 334. The valve member 326 is operated by means of a handle 336 connected thereto by means of an operator 338.

From the foregoing description of the valve members 326 and 306, and from reviewing the relationship of the various bores therethrough with respect to the inlet passages 158 and 160 and the outlet passages 162 and 164, it will be seen that by sliding and rotating the valve members 306 and 326, as desired, the various inlet and outlet passages may be communicated with the reservoir 156 and the pumps 152 and 154, as desired, to produce the desired drive because of the relationship of the various inlet and outlet passages may be reversed through the use of the valve members 306 and 326, the direction of rotation of the input shaft 12 is immaterial.

Figure 14:
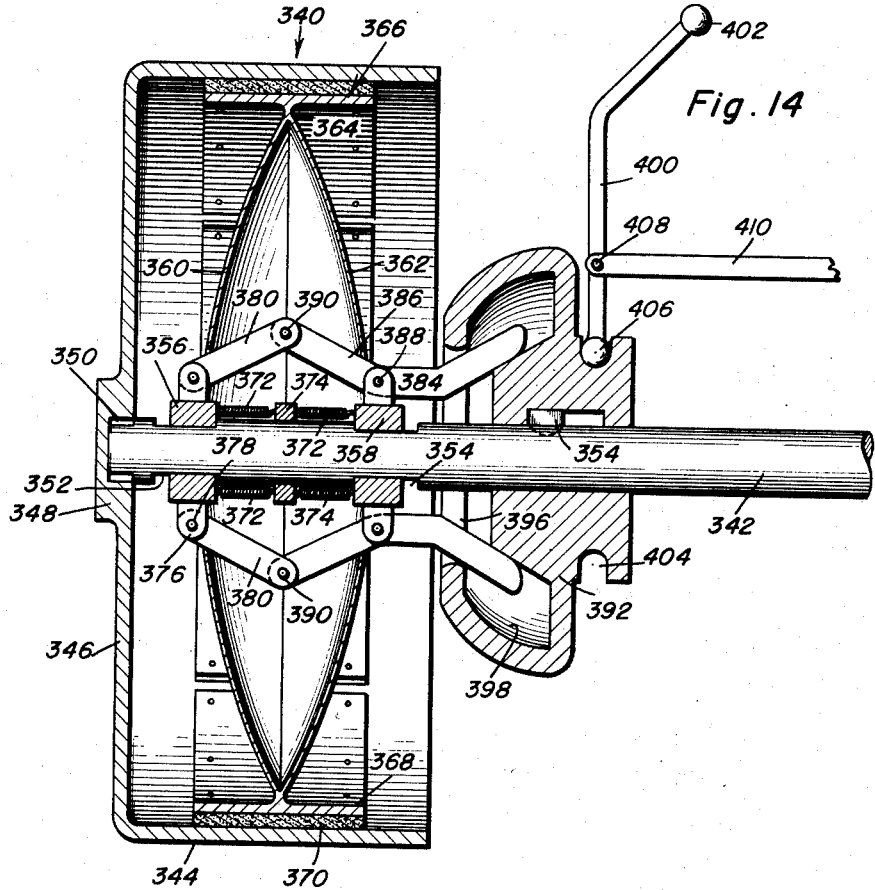
Figure 14 is an enlarged vertical sectional view taken through a modified form of clutch and shows the specific details thereof.
Figure 15:
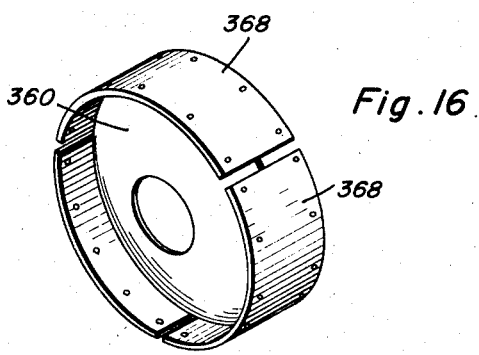
Figure 15 is a reduced perspective view showing the details of a clutch lining for the clutch of Figure 14.
Figure 16:
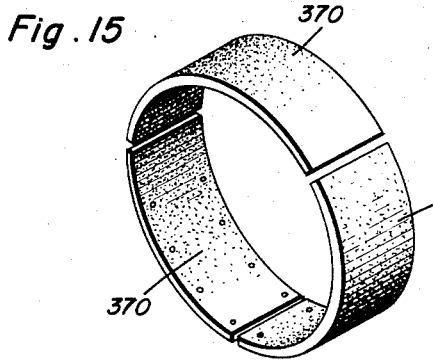
Figure 16 is a reduced perspective view showing the general details of the clutch plate and the backing for the clutch shoes, the clutch lining being omitted.

Referring now to Figures 14, 15 and 16 in particular, it will be seen that there is illustrated a modified form of clutch which is referred to in general by the reference numeral 340. The clutch 340 is mounted on a shaft 342 which, if desired, could be equivalent of the sleeve 38.

The clutch 340 includes a clutch drum 344 having a drive plate 346. The drive plate 346 includes a central hub 348. The hub 348 is intended to have connected thereto a suitable input shaft (not shown) which could correspond to the input shaft 12.

The left end of the shaft 342 is rotatably journaled in a bearing 350 seated in the hub 348. The right end of the shaft 342 (not shown) will be also suitably journaled so that the shaft 342 is mounted for rotation only.

The shaft 342 is provided within the general confines of the clutch drum 344 with a pair of longitudinally spaced annular grooves 352 and 354. The annular grooves 352 and 354 have seated therein split hubs 356 and 358, respectively. The hubs 356 and 358 are suitably keyed to the shaft 342 for rotation therewith and at the same time are free to slide longitudinally of the shaft 342 and the annular grooves 352 and 354.

Connected to the hubs 356 and 358 are resilient plates 360 and 362, respectively. The plates 360 and 362 are parabolic in cross-section and have terminal edges connected together as at 364. Connected to the terminal edges of the plates 360 and 362 are clutch shoes which are referred to in general by the reference numeral 366.

Referring now to Figures 15 and 16, it will be seen that each clutch shoe 366 includes a segmental backing 368 which is secured to the peripheral edges of the plates 360 and 362. Suitably riveted or otherwise secured to each segmental backing 368 is a segmental liner 370. The liner 370 is formed of a suitable friction material such as that normally used in clutch faces and brake shoes.

The resiliency of the plates 360 and 362 in such that they normally urge the clutch shoes 366 outwardly so that the lining 370 frictionally grips the interior of the clutch drum 344 so as to lock the clutch drum 344 to the shaft 342. This is assured by providing a plurality of coil springs 372 which are under tension and which have opposite ends connected to a central collar 374 and to one of the hubs 356 and 358.

In order that the clutch 340 may be moved to a released position, the hub 356 is provided with a plurality of circumferentially spaced ears 376. Pivotally connected to each of the ears 376 by means of a pivot pin 378 is a short link 380 which extends into the confines of the plates 360 and 362.

Carried by the hub 358 is a plurality of circumferentially spaces ears 384. The number of ears 384 correspond to the number of ears 376 and are aligned therewith. Pivotally connected to each ear 384 is an operating lever 386, each operating lever 386 being of a generally U-shaped outline and being connected to its respective ear 384 by means of a pivot pin 388. Each of the levers 386 is aligned with one of the levers 380 and is connected thereto by means of a pivot pin 390.

Carried by the shaft 342 for sliding movement is a shift collar 392, the shift collar 392 being keyed to the shaft 342 by means of a key 394.

The shift collar 392 is provided at the left end thereof with an entrance opening 396 which communicates with an annular recess 398 formed therein. The ends of the levers 386 remote from the pivots 390 are engaged with the boundaries of the recess 398, these boundary surfaces forming cam surfaces for the levers 386.

In order that the shift collar 392 may be shifted along the shaft 342, there is provided a shift lever 400. The shift lever 400 is provided at one end with a ball pivot 402. The shift collar 392 is provided with an annular groove 404. Seated in the annular groove 404 is a ball fitting 406 on the opposite end of the shift lever 400. The shift lever 400 is retained against rotation and the ball 406 permits the shift collar 392 to rotate with the shaft 342 and yet provide the desired connection between the shift lever 400 and the shift collar 392.

Pivotally connected to an intermediate portion of the shift lever 400 by means of a pivot pin 408 is a control link 410. The control link 410 effects the pivoting of the shift lever 400 to slide the shift collar 392 along the shaft 342. Movement of the shift collar 392 to the left, as viewed in Figure 14, results in the spreading apart of the right hand ends of the levers 386. This will result in the movement of the pivots 390 towards each other and results in forcing apart of the hubs 356 and 358. As the hubs 356 and 358 are spread apart, this draws in the peripheral edges of the plates 360 and 362 thus releasing the clutch shoes 366 from the clutch drum 344. Thus the clutch 340 may be selectively manually released.

While the clutch 340 has not been illustrated in conjunction with a transmission, which is the subject of this invention, it is to be understood that the clutch 340 may be used to replace either the clutch 18 or the clutch 186. The manner in which the clutch 340 may be incorporated in either the transmission 10 or the transmission 130 is believed to be obvious.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, said pumps being mounted within a single housing, said output shaft extending through said housing, said control shaft being disposed concentric to said output shaft, and valve means controlling operation of said first and second pumps to control rotation of said ring gear and said spider whereby direction of rotation and speed of said output shaft is controlled.

2. A variable speed and torque transmission comprising a planetary gear unit and a closed circuit hydraulic system including a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising a first and second pumps connected to said output and control shafts, respectively, said pumps being disposed within a single housing encasing said hydraulic system entirely, and valve means controlling operation of said first and second pumps to control rotation of said ring gear and said spider whereby direction of rotation and speed of said output shaft is controlled, said pumps being of the positive displacement type.

3. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, said pump unit including a reservoir, inlet passages connecting said pumps with said reservoir, outlet passages connecting said pumps with said reservoir, said valve means controlling flow through said outlet passages whereby the torque required to operate said pumps may be varied by said valve means, said valve means including valve elements in said inlet passages for closing said inlet passages.

4. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, a clutch selectively locking said ring gear to said input shaft to selectively lock up said planetary gear unit.

5. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, a clutch selectively locking said ring gear to said input shaft to selectively lock up said planetary gear unit, said clutch being of the fluid type, means communicating said clutch with said pump unit for controlling operation of said clutch.

6. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, a clutch selectively locking said ring gear to said input shaft to selectively lock up said planetary gear unit, said clutch being of fluid pressure release type, said valve means including valve elements in said inlet passages for closing said inlet passages, a fluid line communicating at least one of said inlet passages with said clutch whereby said clutch is operated in response to closing of said inlet passages.

7. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, each of said pumps including an outlet passage, said valve means including means for selectively communicating said outlet passage whereby said pumps are connected in opposed relation.

8. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit compirsing first and second pumps connected to said output and control shafts, respectively, and valve means controlling operation of said first and second pumps to control rotation of said ring gear and said spider whereby direction of rotation and speed of said output shaft is controlled, each of said pumps including an outlet passage, said valve means including means for selectively communicating said outlet passage whereby said pumps are connected in opposed relation, said first pump being larger than said second pump whereby an overdrive of said output shaft is effected.

9. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, said pump unit including a reservoir, inlet and outlet passages communicating said first and second pumps with said reservoir, said valve means including valve members positioned in said inlet and outlet passages, said valve members being reversible whereby the relationship of said passages may be reversed permitting reverse rotation of said input shaft.

10. A variable speed and torque transmission comprising a planetary gear unit and a pump unit, said planetary gear unit including an input shaft, a sun gear on said input shaft, a ring gear surrounding said sun gear, a spider, planetary gears carried by said spider meshed between said sun and ring gears, an output shaft connected to said spider, a control shaft connected to said ring gear, said pump unit comprising first and second pumps connected to said output and control shafts, respectively, and valve means controlling operation of said first and second pumps to control rotation of said ring gear and said spider whereby direction of rotation and speed of said output shaft is controlled, a clutch selectively locking said ring gear to said input shaft to selectively lock up said planetary gear unit, said clutch including a drum, a pair of opposed parabolic cross sectional resilient plates having peripheral portions connected together, clutch shoes connected to said peripheral portions, said plates normally retaining said clutch shoes in engagement with said drum, and release means for separating said plates to release said clutch shoes from said drum, said plates forming a fluid type chamber, said release means being in the form of a pressurized fluid source from said pump unit selectively communicated with said chamber.

11. A variable speed and torque transmission comprising a planetary gear unit including an input shaft, a sun gear on said input shaft, a ring gear surrounding said sun gear, a spider, planetary gears carried by said spider meshed between said sun gear and said ring gear, an output shaft connected to said spider, a control shaft connected to said ring gear, said control shaft being disposed concentric to said output shaft, said pump unit including a housing having mounted therein first and second pumps connected to said output shaft and said control shafts, respectively, and valve means controlling operation of said first and second pumps to control rotation of said ring gear and said spider whereby direction of said rotation and speed of said output shaft is controlled, said output shaft extending entirely through said housing, said second pump being of the gear type and including a main drive gear mounted on said output shaft and an idler gear carried by said housing in mesh with said main drive gear, said second pump including a main drive gear mounted on said control shaft and an idler gear carried by said housing in meshing engagement with said second pump main drive gear, said gears of said first pump being disposed in a plane parallel to the plane of said gears of said second pump.

References Cited in the file of this patent

UNITED STATES PATENTS

| 1,176,438 | Deiller | Mar. 21, 1916 |
| 1,951,345 | Centervall | Mar. 20, 1934 |
| 2,288,057 | Weston | June 30, 1942 |
| 2,485,126 | Wood | Oct. 18, 1949 |

FOREIGN PATENTS

| 82,435 | Norway | Sept. 14, 1953 |